3,329,510
PREPARATION OF PACKAGED SLICED DRY SAUSAGE

William D. Paynter and Floyd C. Olson, Madison, Wis., assignors to Oscar Mayer & Co., Inc., Chicago, Ill., a corporation of Illinois
No Drawing. Filed July 27, 1964, Ser. No. 385,513
2 Claims. (Cl. 99—174)

This invention relates to innovations and improvements in the manufacture of packaged, ready-to-eat, dry sausage. More particularly, the invention pertains to such improvements and innovations wherein after dry sausages have been smoked and cooked, they are sliced before undergoing any appreciable drying, and the slices are freeze-dried and then packaged. A number of worthwhile advantages are obtainable in practicing the invention.

The term "dry sausage" is well known in the sausage making art and used therein to identify such sausage items as hard salami, pepperoni and Genoa sausages. The production of dried sausages is well known and has remained essentially unchanged over the years. The initial steps consist of grinding the ingredients to form the batter, stuffing the batter into casings followed by smoking and cooking the whole sausages. In addition to these conventional sausage making steps, there is the additional step in producing dried sausages, e.g. hard salami, of drying the smoked and cooked sausages so as to reduce the total moisture content thereof to approximately 40% or under. In the conventional method of sausage drying, the moisture is removed from the unsliced sausages by evaporation from the outer surfaces thereof at an air temperature of 50–55° F. and a relative humidity of 65 to 70%. This drying process requires 15 to 50 days depending upon the diameter of the sausages. Mold growth tends to develop during drying and it is difficult to avoid it completely. As the moisture is dried from the outer surfaces of the sausages, the moisture from the center thereof slowly migrates toward the outside. This results in final products having a moisture gradient from a high in the center to a low at the outer surfaces. Proteins on the surface tend to become denatured during the drying process and do not readily rehydrate, even after a period of equilibration of the product. This prevents equilibration of moisture throughout the final product when it is sliced and leaves a hard outer skin.

In addition to the foregoing disadvantages of the conventional drying procedure used in manufacturing dry sausages of the hard salami-type, there is the substantial economic disadvantage of tying up a large inventory of product in various stages of dryness for relatively long periods. Another obvious disadvantage is that of lack of flexibility in meeting demand. In other words, because of the long time required in carrying out the drying step, it is not possible for the manufacturer to readily meet an unexpected demand which his inventory will not satisfy. Accordingly, the sausage manufacturer finds it necessary to either run short periodically, or to frequently have surpluses of dry sausage products for substantial periods.

According to the present invention a method of producing packaged, ready-to-eat dry sausage in slice form is provided which offers the following advantages over the conventional drying process:

(1) The drying time is reduced to one hour or less.
(2) The drying time is completely independent of sausage diameter.
(3) Molding is completely eliminated.
(4) Denaturation at the surface is eliminated and moisture equilibration is readily attained.
(5) A high degree of flexibility is offered from the standpoint of moisture content.
(6) Large inventories in process are avoided.

Accordingly, the object of this invention, generally stated, is the provision of an improved method of processing dry sausages after they have been smoked and cooked so as to obtain the foregoing advantages, such improved process making use of the step of partially freeze-drying the smoked and cooked sausages in the sliced condition and the further step of packaging the freeze-dried product in substantially oxygen-free containers and allowing the moisture to equilibrate through the slices while in the packaged condition.

Certain more specific objects of the invention will in part be obvious and will in part appear hereinafter.

For a more complete understanding of the nature and scope of the invention reference may now be had to the following detailed description thereof wherein a preferred working example will be set forth and illustrative permissible variations therein indicated.

Example

Hard salami-type sausages are prepared, smoked and cooked in the well known manner using any desired batter formulation. However, instead of placing the sausages in a conventional drying room, they are taken right after the smoking and cooking operation, and before they have undergone any appreciable drying, and sliced into slices which may range in thickness (depending upon the setting of the slicer) from $\frac{1}{16}$ to $\frac{1}{8}$ inch in thickness. Thinner or thicker slices are not ordinarily desired.

The slices are promptly frozen at a temperature substantially below freezing and held thereat for a time sufficient to destroy any trichinae that may be present. For example, the slices may be placed on expanded metal trays and frozen at −65° F. and held at that temperature for six hours. The slices are then transferred from the freezer to the vacuum chamber of a previously chilled freeze-drier so as to prevent thawing on the surface during the time required to pull the desired vacuum on the freeze-drier box. In this connection any suitable freeze-drier equipment of known type and commercially available on the market may be used.

One tray of the frozen sliced product to be dried is placed on the scale pan of the freeze-drier so as to serve as a guide in determining when the desired amount of moisture has been removed. The pressure within the chamber of the freeze-drier is drawn down by evacuation to approximately 500 microns and the platens of the drier are heated to a temperature of 100° F. Freeze-drying under these conditions is allowed to continue for approximately 30 minutes at which time the recorder for the scale pan reaches a reading of 75%. The chamber of the freeze-drier is then back-filled with nitrogen and the partially freeze-dried product is removed and immediately packaged under vacuum in shingle form in saran-coated, Mylar polyethylene laminated pouches. Desirably, the packages are stored at a temperature of 38–40° F. until the product is required for consumption.

During the partial freeze-drying of the slices, the moisture that is removed comes predominantly from the surfaces of the slices and the material immediately beneath the surfaces. The result is that at the end of the partial freeze-drying there is a surface layer of appreciable depth which is dehydrated to a substantial degree, whereas inwardly thereof, the moisture content remains substantially unchanged. However, this outer dehydrated surface layer is not denatured and as the partially freeze-dried slices remain in the packaged condition at temperatures above freezing, the moisture content in the slices readily equilibrates throughout the slices. Hence in the finished product the moisture content at the centers of the slices is substantially the same as that at the margins.

The following permissible variations may be used in connection with the foregoing example:

(1) The slices may be freeze-dried so that the total residual moisture content thereof is between 25 to 50%. However, the preferred range of moisture content is from 35 to 40%.

(2) The chamber of the freeze-drier may be evacuated to an absolute pressure between 300 microns to 100 mm. (mercury).

(3) The platens may be at a temperature within the range of 32° F. to 250° F. Low temperatures substantially increase the freeze-drying time. High temperatures at the upper end of the range increase the chance of thawing and the likelihood of fats smearing and melting during drying, which should be avoided as undesirable. A preferred range is from about 100° F. to about 140° F.

(4) Instead of back-filling with nitrogen the freeze-drier chamber could be back-filled with carbon dioxide.

(5) The freeze-dried products can be hermetically sealed in any suitable air-impermeable packaging material, either flexible or rigid, and the containers may be either evacuated or flushed and filled with an inert gas such as nitrogen or carbon dioxide.

It will be appreciated that certain other changes may be made in the basic process as exemplified in the foregoing example without departing from the spirit and scope of the invention.

What is claimed as new is:

1. The method of making packaged, ready-to-eat dry sausage in sliced form which comprises, slicing dry sausages after the same have been smoked and cooked and before they have undergone appreciable drying into slices not exceeding approximately ⅛ inch in thickness, freezing said slices, only partially freeze-drying said slices to reduce the total moisture content thereof down to a residual moisture content of from about 25 to 50% by weight with most of the dehydration occurring at the slice surfaces, and hermetically sealing said partially freeze-dried slices in substantially oxygen-free packages, said residual moisture content becoming substantially uniformly distributed throughout each of said slices as the same are held in the unfrozen ready-to-eat condition.

2. The method of claim 1 wherein said partial freeze-drying is carried out at a pressure in the range of about 300 microns to 100 millimeters mercury with the platen temperatures in the range of about 100° F. to 140° F.

References Cited

UNITED STATES PATENTS

| | | | |
|---|---|---|---|
| 2,419,877 | 4/1947 | Birdseye | 99—199 X |
| 2,765,236 | 10/1956 | Blaine | 99—199 X |
| 3,033,687 | 5/1962 | Harper et al. | 99—187 X |
| 3,118,742 | 1/1964 | Dalgleish et al. | |
| 3,239,942 | 3/1966 | Mink et al. | |

FOREIGN PATENTS

| | | |
|---|---|---|
| 538,191 | 3/1957 | Canada. |
| 940,003 | 10/1963 | Great Britain. |

OTHER REFERENCES

Van Arsdel et al.: "Food Dehydration," 1963, vol. 1, published by the Avi Publishing Co., Inc., Westport, Conn., pp. 159–160, article entitled "Analysis of Mechanism."

A. LOUIS MONACELL, *Primary Examiner.*

HYMAN LORD, *Examiner.*